(12) United States Patent
Azechi et al.

(10) Patent No.: US 12,008,279 B2
(45) Date of Patent: Jun. 11, 2024

(54) PRINTER AND NON-TRANSITORY COMPUTER-READABLE RECORDING MEDIUM STORING COMPUTER-READABLE INSTRUCTIONS FOR PRINTER

(71) Applicant: Brother Kogyo Kabushiki Kaisha, Nagoya (JP)

(72) Inventors: Haruka Azechi, Nagoya (JP); Yushi Deura, Nagoya (JP); Shunsuke Minamikawa, Nagoya (JP); Takatsugu Yamada, Nagoya (JP); Wataru Hasegawa, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/066,397

(22) Filed: Dec. 15, 2022

(65) Prior Publication Data
US 2023/0205471 A1  Jun. 29, 2023

(30) Foreign Application Priority Data

Dec. 28, 2021 (JP) .................. 2021-214993

(51) Int. Cl.
*G06F 3/12* (2006.01)
(52) U.S. Cl.
CPC .......... *G06F 3/1264* (2013.01); *G06F 3/1205* (2013.01); *G06F 3/1228* (2013.01); *G06F 3/1232* (2013.01); *G06F 3/1258* (2013.01)

(58) Field of Classification Search
CPC .... G06F 3/1264; G06F 3/1205; G06F 3/1228; G06F 3/1232; G06F 3/1258; G06F 3/1285; G06F 3/1204
See application file for complete search history.

(56) References Cited

U.S. PATENT DOCUMENTS

| 2006/0028672 A1* | 2/2006 | Abiko | ................... G06F 3/1204 |
| | | | 358/1.14 |
| 2010/0316426 A1* | 12/2010 | Takahashi | ............. G06F 3/1263 |
| | | | 400/76 |

(Continued)

FOREIGN PATENT DOCUMENTS

JP  2021-094784 A  6/2021

*Primary Examiner* — Huo Long Chen
(74) *Attorney, Agent, or Firm* — KENEALY VAIDYA LLP

(57) ABSTRACT

A printer includes: a print executing unit configured to execute printing on a sheet paper; a process executing unit configured to execute a predetermined process related to cutting of the sheet paper; and a controller. The controller is configured to, in a case where a first sheet paper having a first size is contained, send capability information to a terminal device, wherein the capability information includes specific size information indicating a sheet paper having a specific size. The specific size information includes a specific character string. The controller is configured to receive selection information indicating that the specific size was selected from the terminal device in response to a user selecting the specific character string. The controller is configured to, in a case where the selection information is received from the terminal device, cause the process executing unit to execute the predetermined process on the first sheet paper.

23 Claims, 10 Drawing Sheets

(56) References Cited

U.S. PATENT DOCUMENTS

Figure 1:
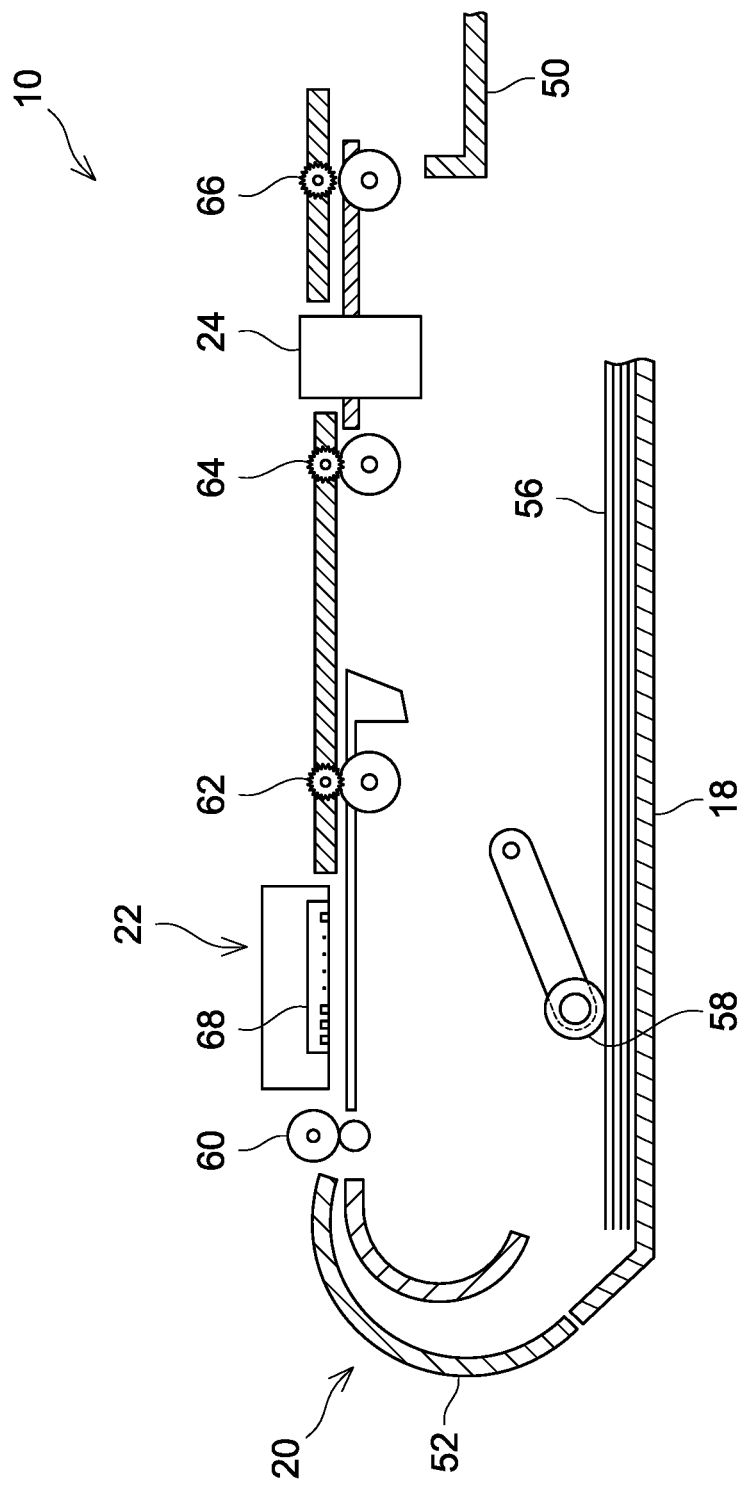

| | | | |
|---|---|---|---|
| 2019/0286391 A1* | 9/2019 | Totsuka | G06F 3/1286 |
| 2020/0081674 A1* | 3/2020 | Fukami | G06F 3/1268 |
| 2021/0178785 A1 | 6/2021 | Miura | |

* cited by examiner

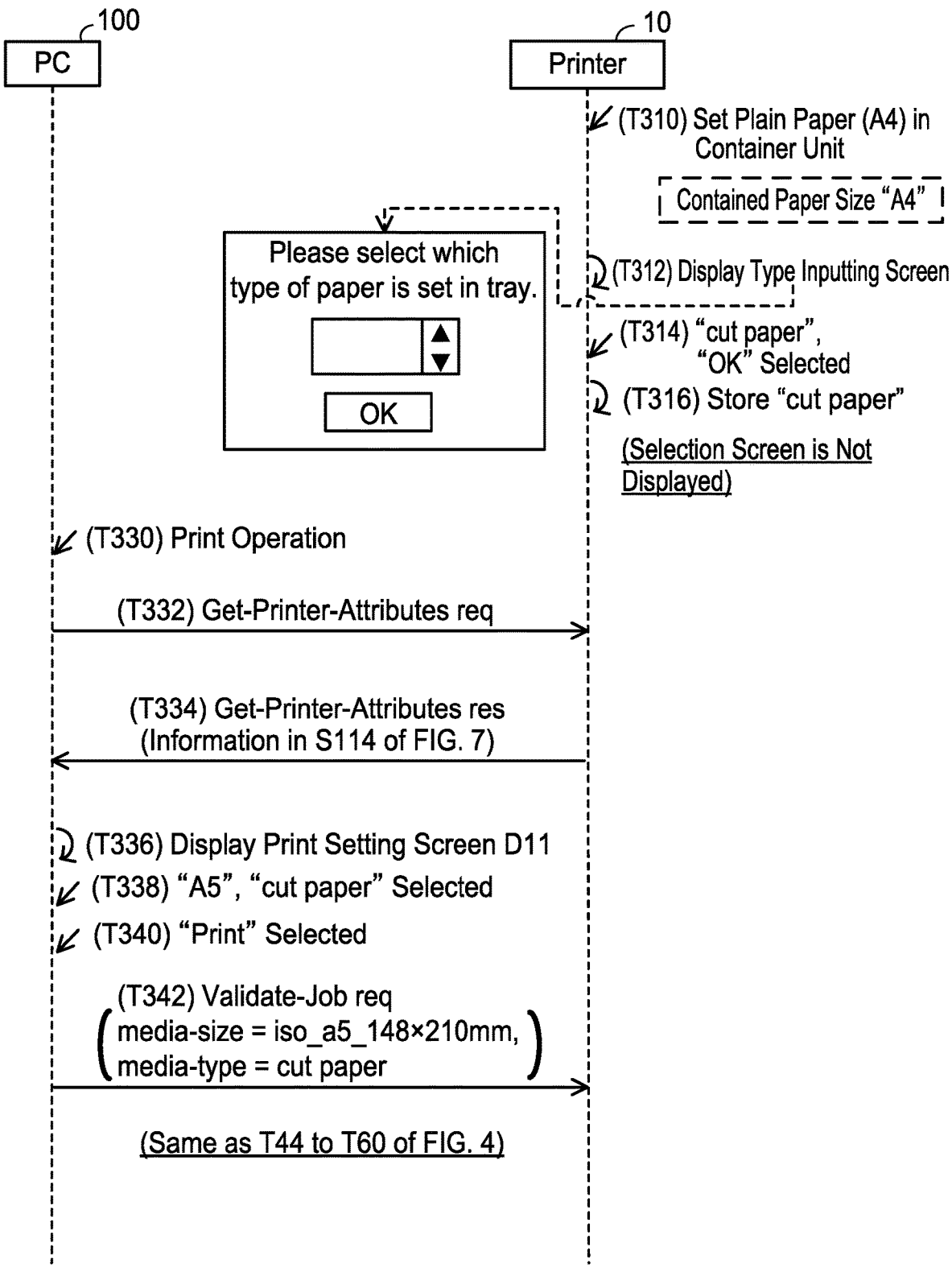

PRINTER AND NON-TRANSITORY COMPUTER-READABLE RECORDING MEDIUM STORING COMPUTER-READABLE INSTRUCTIONS FOR PRINTER

REFERENCE TO RELATED APPLICATIONS

This application claims priority from Japanese Patent Application No. 2021-214993 filed on Dec. 28, 2021. The entire content of the priority application is incorporated herein by reference.

BACKGROUND ART

A printing device configured to cut a sheet paper is known.

DESCRIPTION

The present teachings provide an art configured to improve user convenience of a printer configured to execute a predetermined process related to cutting a sheet paper.

A printer disclosed herein may comprise: a container unit configured to contain a sheet paper; a transportation unit configured to transport the sheet paper from the container unit; a print executing unit configured to execute printing on the sheet paper; a process executing unit configured to execute a predetermined process related to cutting of the sheet paper; and a controller. The controller may be configured to: send capability information to a terminal device, wherein in a case where a first sheet paper having a first size is contained in the container unit, the capability information includes specific size information indicating a sheet paper having a specific size which is smaller than the first size, and the specific size information includes a specific character string indicating a content of the predetermined process; in response to a user selecting the specific character string displayed on the terminal device after the capability information has been sent to the terminal device, receive selection information indicating that the specific size was selected and image data representing an image to be printed from the terminal device; in a case where the selection information and the image data are received from the terminal device, cause the transportation unit to transport the first sheet paper and cause the print executing unit to print the image on the first sheet paper; and in a case where the selection information is received from the terminal device, cause the process executing unit to execute the predetermined process to the first sheet paper.

According to the above configuration, the printer sends the capability information including the specific size information indicating the sheet paper having the specific size smaller than the first size to the terminal device in the case where the first sheet paper having the first size is contained. The specific size information includes the specific character string indicating the content of the predetermined process related to cutting. As a result of this, the specific character string is displayed on the terminal device. Accordingly, the user is able to easily select the specific character string displayed on the terminal device in the case where the user wishes the predetermined process on the sheet paper to be performed. Due to this, user convenience is improved.

Another printer disclosed herein may comprise: a container unit configured to contain a sheet paper; a transportation unit configured to transport the sheet paper from the container unit; a print executing unit configured to execute printing on the sheet paper; a process executing unit configured to execute a predetermined process related to cutting of the sheet paper; and a controller. The controller may be configured to: send capability information to a terminal device, wherein in a case where a first sheet paper having a first paper type is contained in the container unit, the capability information includes specific type information indicating a sheet paper having a specific paper type different from the first paper type, and the specific type information includes a specific character string indicating a content of the predetermined process; in response to a user selecting the specific character string displayed on the terminal device after the capability information has been sent to the terminal device, receive selection information indicating that the specific paper type was selected and image data representing an image to be printed from the terminal device; in a case where the selection information and the image data are received from the terminal device, cause the transportation unit to transport the first sheet paper and cause the print executing unit to print the image on the first sheet paper; and in a case where the selection information is received from the terminal device, cause the process executing unit to execute the predetermined process on the first sheet paper.

According to the above configuration, in the case where the first sheet paper having the first paper type is contained, the printer sends the capability information including the specific type information indicating a specific paper type different from the first paper type to the terminal device. The specific type information includes the specific character string indicating the content of the predetermined process related to cutting. As a result of this, the specific character string is displayed on the terminal device. Accordingly, in the case where the user wishes the predetermined process on the sheet paper to be executed, the user can easily select the specific character string displayed on the terminal device. Due to this, user convenience is improved.

A control method for realizing the printer, a computer-readable instructions for the printer, and a non-transitory computer-readable recording medium storing the computer-readable instructions for the printer are also novel and useful. Further, a communication device comprising the printer and a terminal device is also novel and useful.

Figure 2:
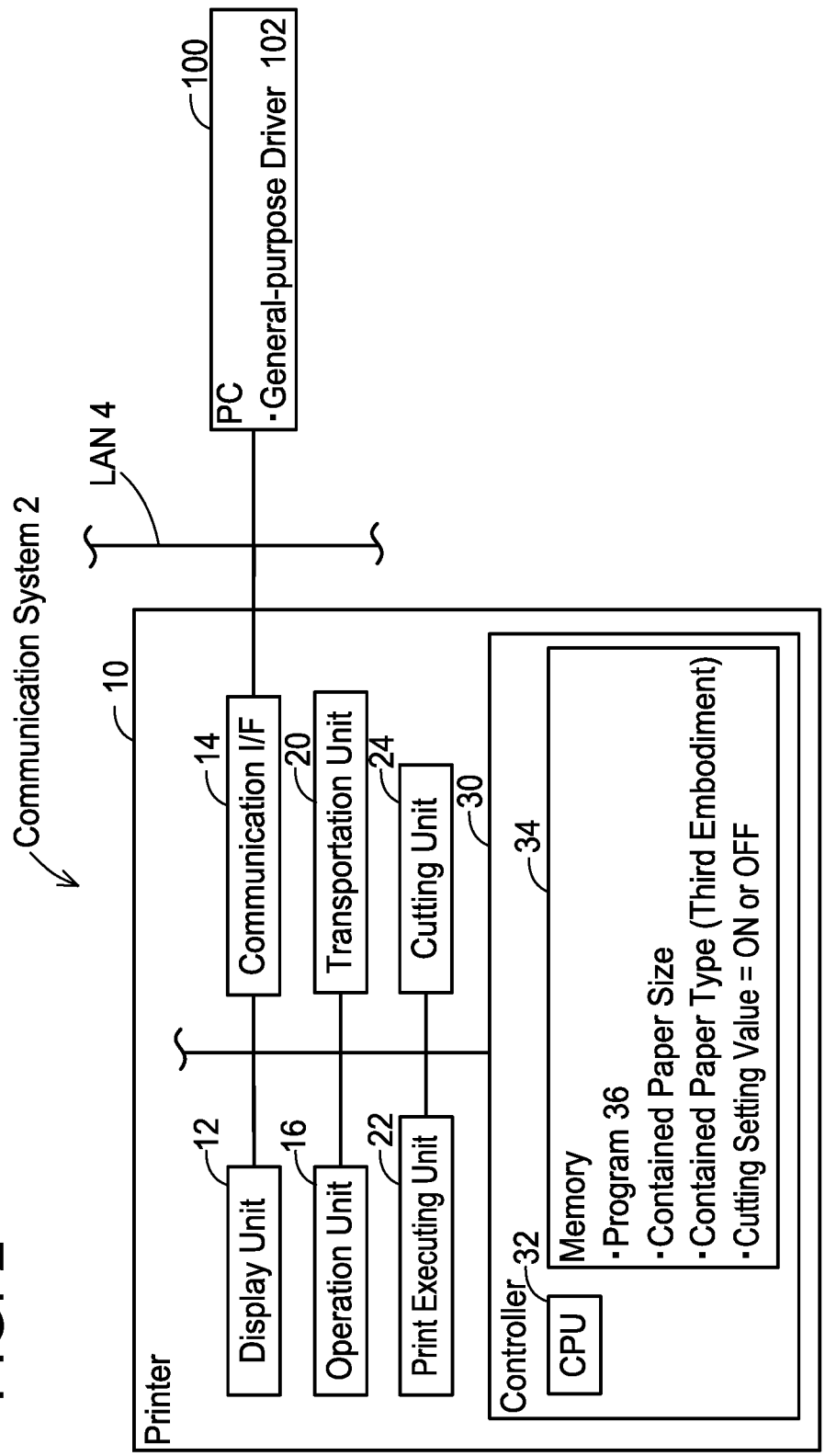
Figure 3:
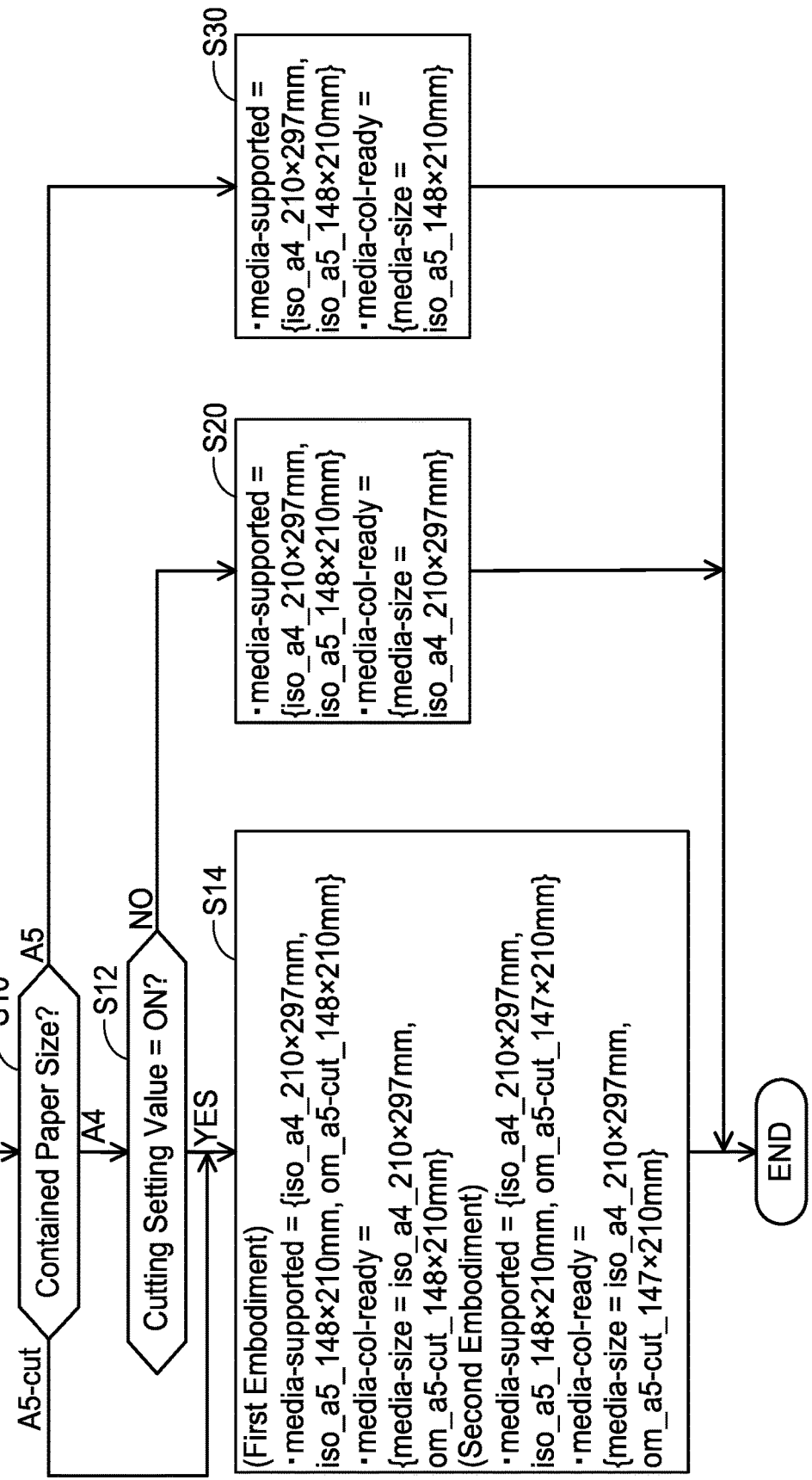
Figure 4:
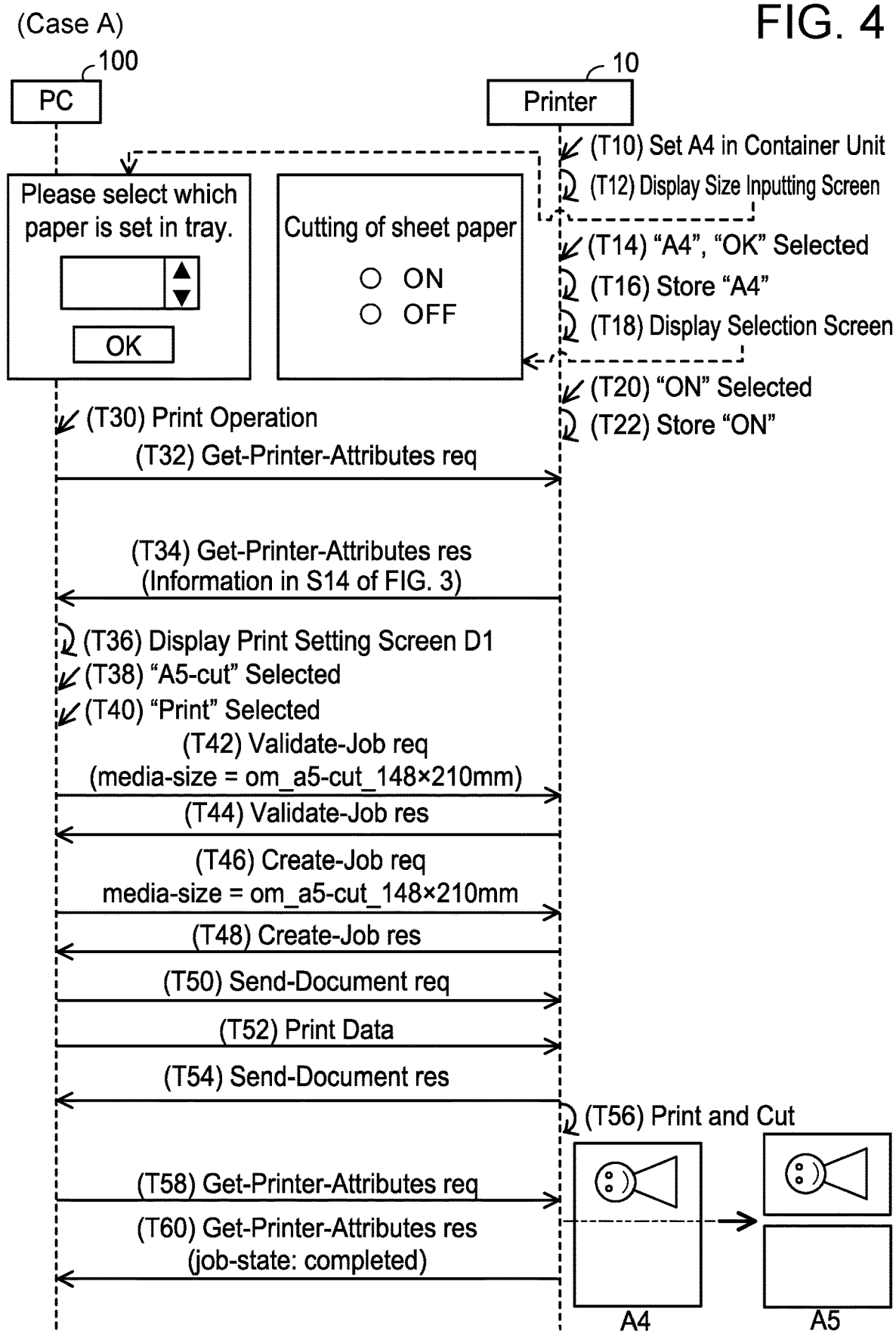
Figure 5:
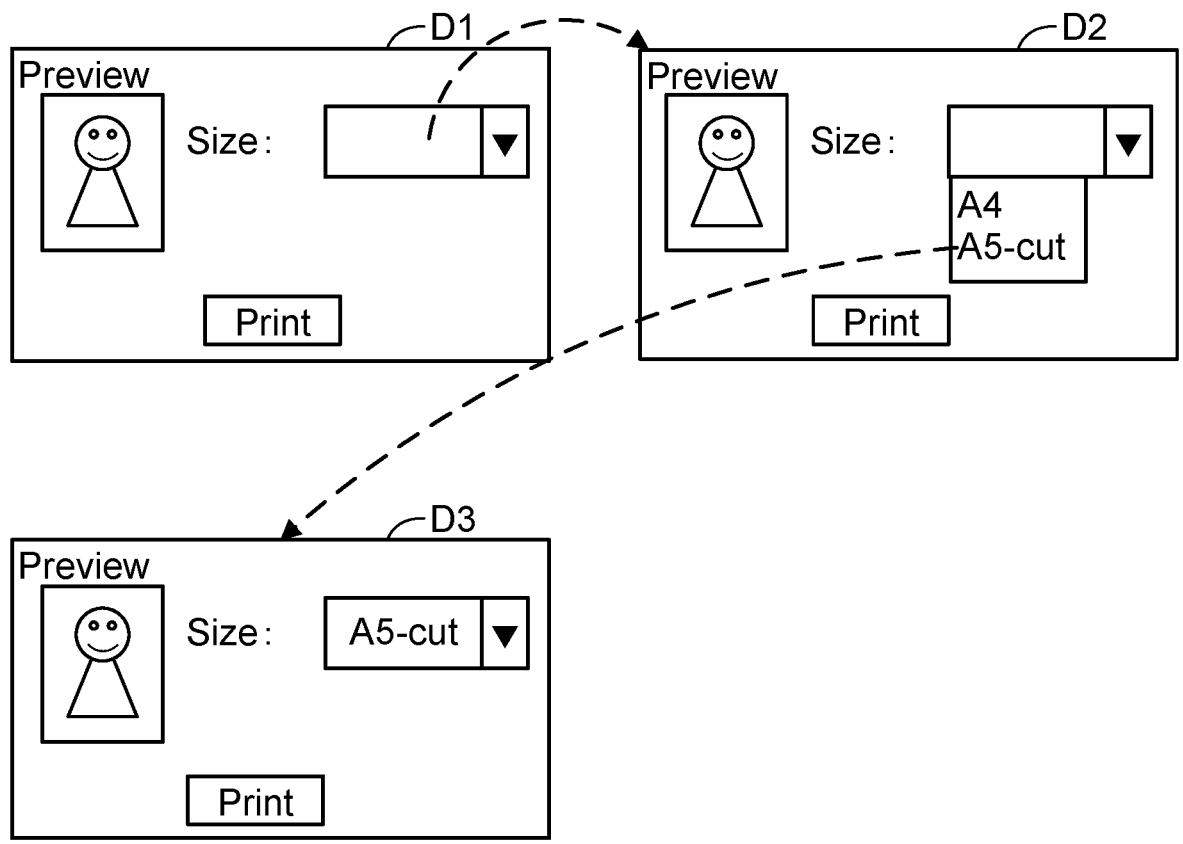
Figure 6:
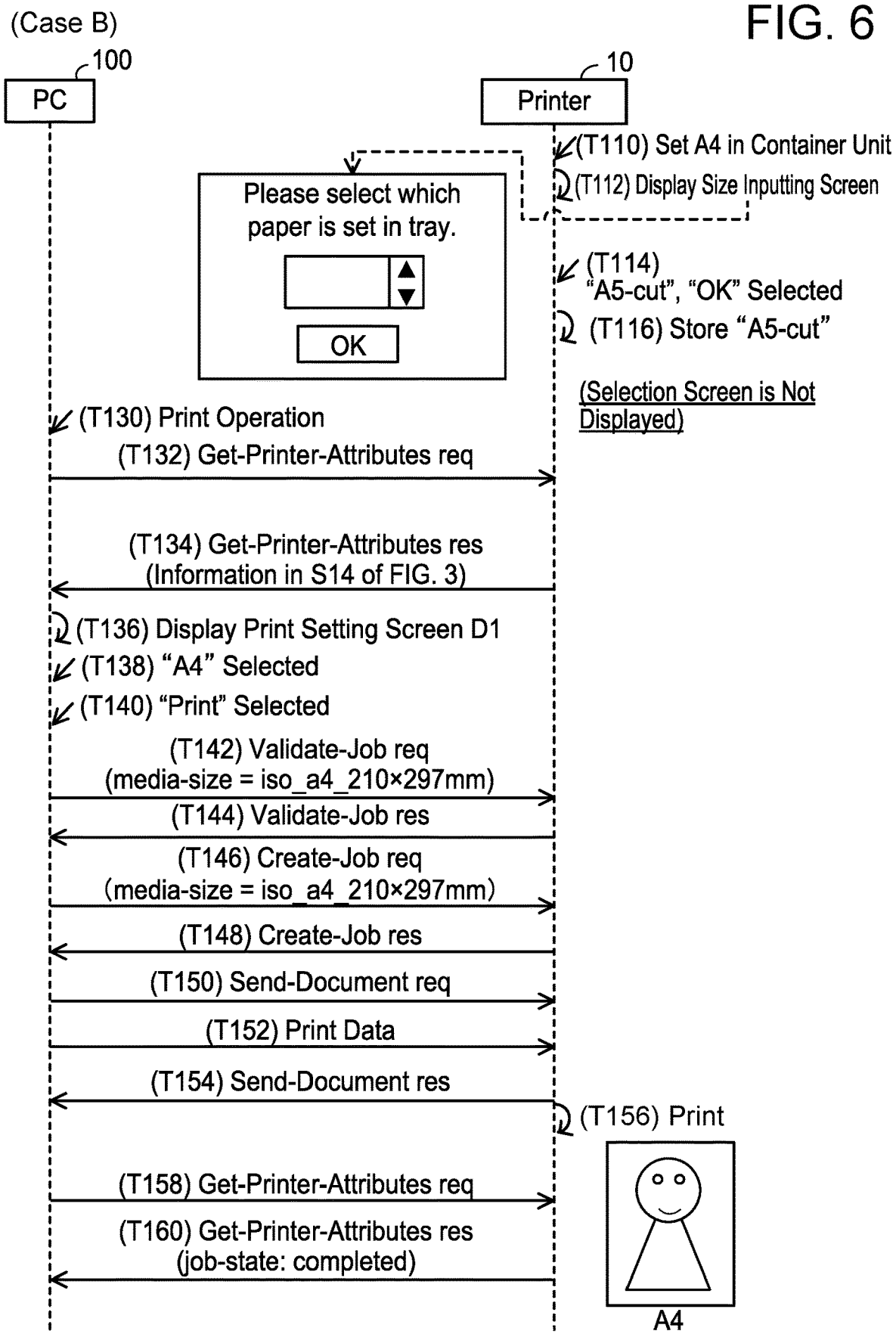
Figure 7:
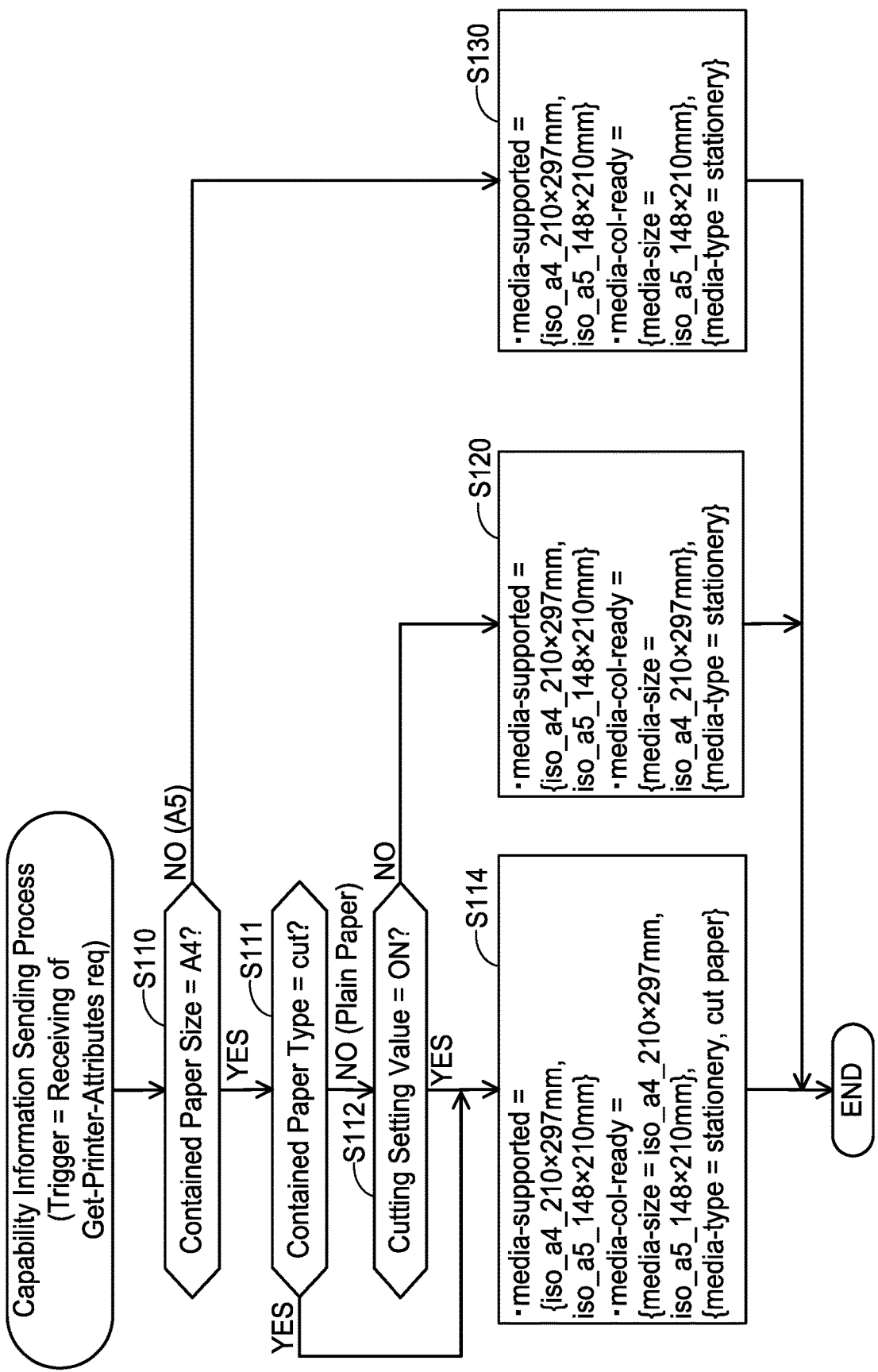
Figure 8:
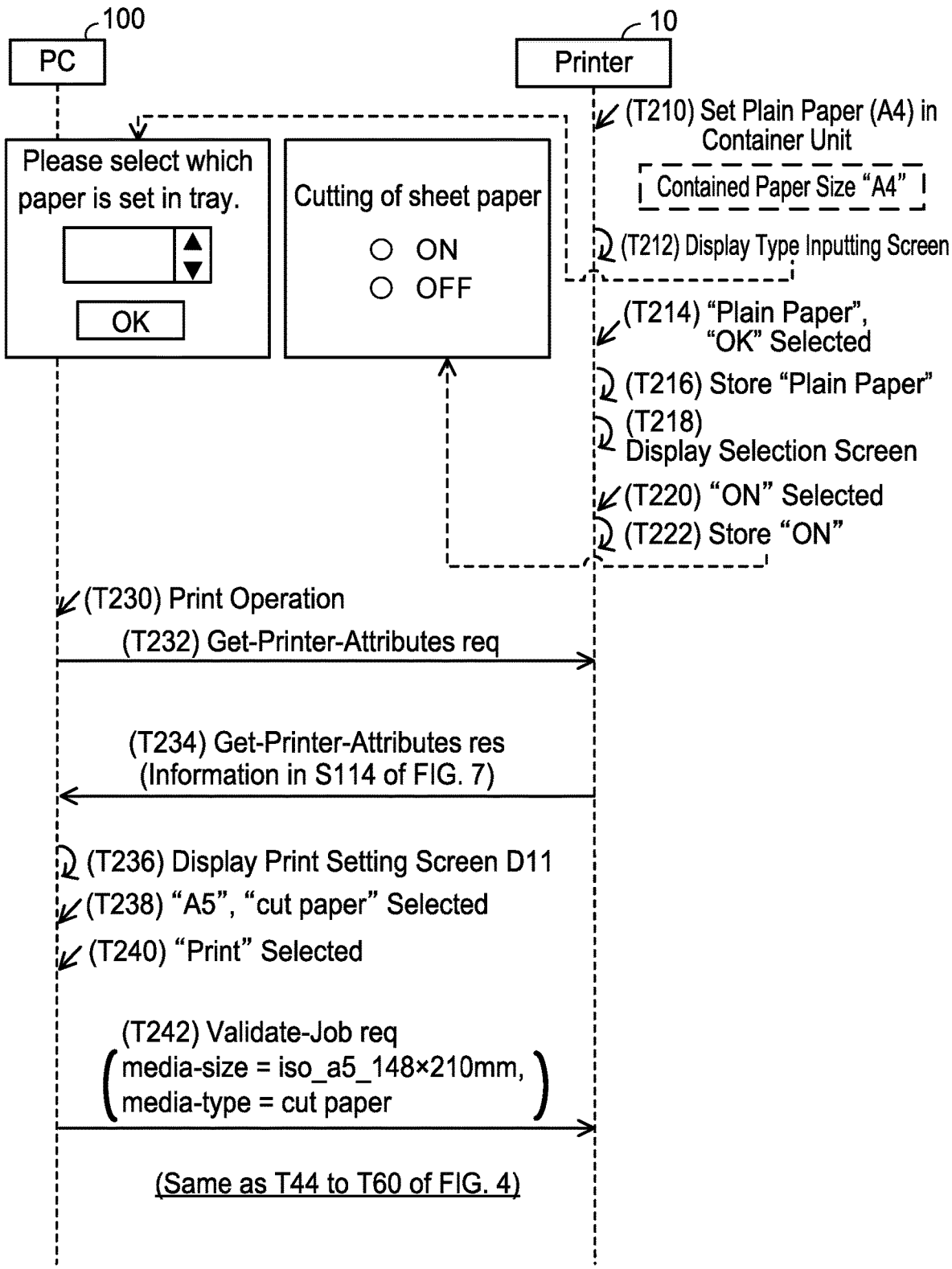
Figure 9:
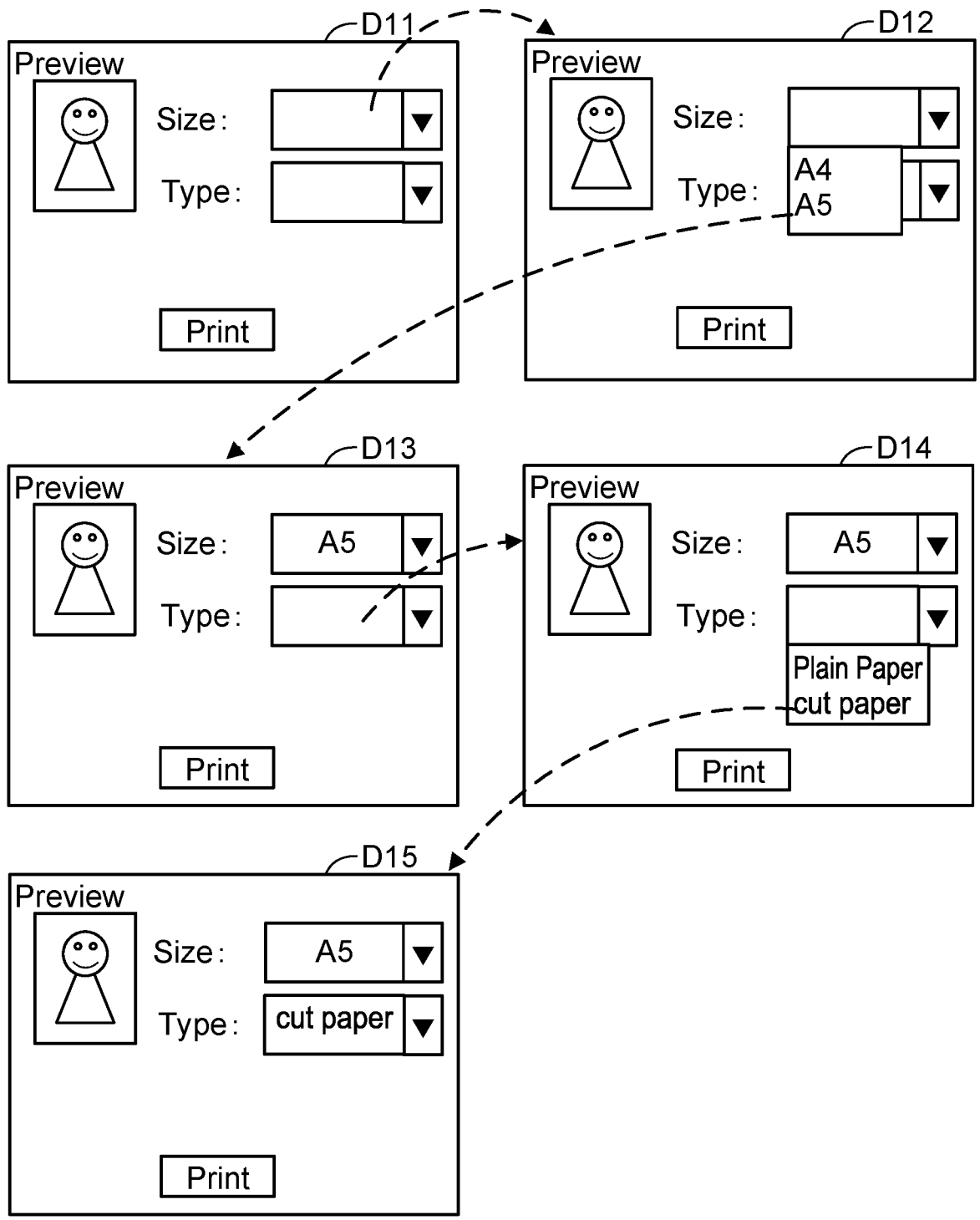

FIG. 1 illustrates a hardware configuration of a printer.
FIG. 2 illustrates a control configuration of the printer.
FIG. 3 illustrates a flowchart of capability information sending process according to first and second embodiments.
FIG. 4 illustrates a sequence diagram of Case A.
FIG. 5 illustrates examples of a print setting screen.
FIG. 6 illustrates a sequence diagram of Case B.
FIG. 7 illustrates a flowchart of capability information sending process according to a third embodiment.
FIG. 8 illustrates a sequence diagram of Case C.
FIG. 9 illustrates examples of a print setting screen.
FIG. 10 illustrates a sequence diagram of Case D.

FIRST EMBODIMENT

Hardware Configuration of Printer 10; FIG. 1

As shown in FIG. 1, a printer 10 comprises a container unit 18, a transport unit 20, a print executing unit 22, a cutting unit 24, and an output tray 50. The container unit 18, the transport unit 20, the print executing unit 22, and the cutting unit 24 are arranged inside a housing (not shown) of the printer 10. The output tray 50 is exposed outside the housing.

The container unit 18 contains sheet papers 56. A "sheet paper" is a paper that is precut in a predetermined size such as A4, A5, letter, and postcard. In the present embodiment, the container unit 18 is configured to contain the sheet papers of A4 size and of A5 size.

The transport unit 20 comprises a transport path 52 and a plurality of rollers 58, 60, 62, 64, 66. Each sheet paper 56 contained in the container unit 18 is transported along the transport path 52 by the rollers 58, etc.

The print executing unit 22 includes an inkjet head 68 in the present embodiment. The inkjet head 68 prints an image on the sheet paper 56 by ejecting ink on the sheet paper 56 transported by the rollers 58, 60. The sheet paper 56 on which printing was executed is further transported downstream in a transport direction by the rollers 62, 64. In a modification, the print executing unit 22 may comprise a printing mechanism of laser method.

The cutting unit 24 includes a cutting blade (not shown). The cutting unit 24 is configured to cut the sheet paper 56 on which printing was executed by the cutting blade moving in a direction perpendicular to sheet surface of FIG. 1. Due to this, the sheet paper 56 is divided into a part upstream and a part downstream in the transport direction. In particular, the cutting unit 24 cuts the sheet paper 56 along a straight line connecting respective middle points of a pair of long sides of the sheet paper 56, by which the sheet paper 56 is cut in half. That is, the cutting unit 24 is able to form two A5-sized sheets as cut by cutting a sheet paper of A4 size in half, for example. The respective sheets of sheet paper 56 as cut are further transported downstream in the transport direction by the roller 66. Due to this, the respective sheets of sheet paper 56 as cut reach the output tray 50.

Thus, the printer 10 according to the present embodiment is configured to cut the sheet paper 56. Due to this, as long as a user of the printer 10 prepares a sheet paper of A4 size, the user is able to obtain a printed paper having a size smaller than A4 size (e.g., A5 size). For example, even when the user wishes to execute a print on a sheet paper of A5 size although the user does not have any sheet paper of A5 size, the printer 10 is able to provide the sheet paper of A5 size to the user by executing printing on a sheet paper of A4 size and cutting the sheet paper of A4 size.

Control Configuration of Printer 10; FIG. 2

Next, a control configuration of the printer 10 will be described with reference to FIG. 2. A communication system 2 is realized by the printer 10 and a PC 100. The printer 10 and the PC 100 are connected to a local area network (LAN) 4. The printer 10 and the PC 100 are configured to communicate with each other via the LAN 4. The LAN 4 may be a wired LAN, or may be a wireless LAN.

The printer 10 comprises a display unit 12, a communication interface 14, an operation unit 16, the transport unit 20, the print executing unit 22, the cutting unit 24, and a controller 30. Each unit 12 to 30 is connected to a bus line (refence sign omitted).

The display unit 12 is a display configured to display various types of information. The display unit 12 functions as a so-called touch screen. That is, the display unit 12 functions as an operation unit configured to be operated by a user. The communication interface 14 is connected to the LAN 4. The operation unit 16 comprises a plurality of keys. The user is able to input various instructions to the printer 10 by operating the operation unit 16. The rollers 58, etc. of the transport unit 20, the print executing unit 22, and the cutting unit 24 transport the sheet paper 56, print on the sheet paper 56, and cut the sheet paper 56 in accordance with instructions from the controller 30 (that is, a CPU 32 to be described later).

The controller 30 comprises the CPU 32 and a memory 34. The CPU 32 is configured to execute various processes in accordance with a program 36 stored in the memory 34. The memory 34 may be composed of a volatile memory, a non-volatile memory, and/or the like, for example. The memory 34 stores a contained paper size and a cutting setting value besides the above program 36.

The contained paper size indicates the size of the sheet paper being contained in the container unit 18. Although details will be described below, the size of this sheet paper is inputted to the printer 10 by the user upon the sheet paper being set in the container unit 18. The inputted size is stored as the contained paper size in the memory 34. In the present embodiment in particular, in addition to various paper sizes written in tables 3 to 7 of the Printer Working Group Media Standardized Names 2.0 (PWG MSN 2.0), it is possible to input other paper size(s) besides the paper sizes written in tables 3 to 7 of PWG MSN 2.0. The latter paper size is a paper size defined by a vendor of the printer 10, and is specifically "A5_cut". The paper size "A5-cut" is information indicating a paper size related to the cutting of the sheet paper. Here, the paper size "A5-cut" indicating the paper size related to cutting the sheet paper is just an example, and may be any other character string as long as it is related to cutting. The cutting setting value indicates either "On" indicating that the printer 10 is to cut the sheet paper or "Off" indicating that the printer 10 is not to cut the sheet paper. In what way the cutting setting value is stored in the memory 34 will be described below.

Configuration of PC 100

The PC 100 is used by the user of the printer 10. The PC 100 comprises a general-purpose driver 102. The general-purpose driver 102 is a printer driver provided by an entity different from a vendor of the printer 10. The general-purpose driver 102 is different from a printer driver dedicated (that is, dedicated driver) to a given printer, and is configured to cause various types of printers manufactured by plural printer vendors to execute printing. The general-purpose driver 102 may be installed in the PC 100 from a server on the internet (not shown), or may be installed in the PC 100 in advance prior to the shipment of the PC 100. In the present embodiment, the general-purpose driver 102 is a printer driver configured to execute processes in accordance with Internet Printing Protocol (IPP). In a modification, the general-purpose driver 102 may be a printer driver configured to execute processes in accordance with a scheme different from the IPP scheme.

Capability Information Sending Process; FIG. 3

Subsequently, with reference to FIG. 3, a capability information sending process executed by the CPU 32 of the printer 10 will be described. The capability information sending process starts with receiving Get-Printer-Attributes request according to the IPP scheme from the PC 100 as a trigger for the process. Hereinbelow, Get-Printer-Attributes will be referred to as "GPA", and request will be referred to as "req". The GPA req is a command for requesting a printer to send capability information indicating print condition(s) which the printer is able to execute.

In S10, the CPU 32 determines which of A4, A5, and A5-cut the contained paper size stored in the memory 34 is.

In the case where the contained paper size is determined to be A4 ("A4" in S10), the CPU 32 proceeds to S12, in the case where the contained paper size is determined to be A5 ("A5" in S10), the CPU 32 proceeds to S30, and in the case where the contained paper size is determined to be A5-cut ("A5-cut" in S10), the CPU 32 proceeds to S14.

In S12, the CPU 32 determines whether the cutting setting value stored in the memory 34 indicates ON or OFF. In a case where the cutting setting value indicates ON (YES in S12), the CPU 32 proceeds to S14, whereas in a case where the cutting setting value indicates OFF (NO in S12), the CPU 32 proceeds to S20.

In S14, the CPU 32 sends GPA response to the PC 100. Hereinbelow, response will be referred to as "res". The GPA res includes information related to media-supported (hereinbelow "ms") and information related to media-col-ready (hereinbelow "mcr"). Here, the GPA res may include, in addition to the above information, information representing a paper type, and information indicating a post process executable in the printer 100 (e.g., process of stapling printed papers with a stapler), for example. ms is information indicating the size of the sheet paper onto which the printer 10 is configured to print (in other words, size which can be contained in the container unit 18). mcr is information indicating the size of the sheet paper being contained in the container unit 18. That is, "iso_a4_210×297 mm, iso_a5_148×210 mm" included in ms of S14 indicates that the container unit 18 is capable of containing the A4-sized sheet paper and the A5-sized sheet paper. Further, "om_a5-cut_148×210 mm" included in ms includes the character string "A5-cut" which indicates the paper size which does not actually exist. That is, the paper size "A5-cut" is a paper size which is not the ones written in tables 3 to 7 of PWG MSN 2.0 and is one defined by the vendor. "om_a5-cut_148×210 mm" indicates that the paper size "A5-cut" can be contained in the container unit 18 although the paper size "A5-cut" cannot be actually contained. In other words, "om_a5-cut_148×210 mm" indicates that the printer 10 is capable of forming the A5-sized sheet paper by cutting the A4-sized sheet paper. "om_a5-cut_148×210 mm" may be written in accordance with a format written in 5. Media Size Self-Describing Names of PWG MSN 2.0. Further, the paper size "A5-cut" may be the same character string as a character string "a5-cut" included in "om_a5-cut_148×210 mm" or may be different.

"media-size=iso_a4_210×297 mm" included in mcr of S14 indicates that the A4-sized sheet paper is contained in the container unit 18. Further, "media-size=om_a5-cut_148×210 mm" included in mcr includes the character string "A5-cut" indicating a paper size which does not actually exist (i.e., paper size defined by the vendor). "media-size=om_a5-cut_148×210 mm" indicates that the paper size "A5-cut" is contained in the container unit 18 although it is actually not contained. In other words, "media-size=om_a5-cut_148×210 mm" indicates that the printer 10 is capable of forming the A5-sized sheet paper by cutting the A4-sized sheet paper. Alternatively in a modification, the information indicating the size of the sheet paper being contained in the container unit 18 may be sent as media-ready instead of mcr. Further, in another modification, mcr and media-ready both may be sent or neither of mcr nor media-ready may be sent. When the process of S14 is completed, the processes of FIG. 3 are completed.

In S20, the CPU 32 sends GPA res including "iso_a4_210×297 mm, iso_a5_148×210 mm" as ms and "media-size=iso_a4_210×297 mm" as mcr to the PC 100. That is, this GPA res does not include the information indicating "A5-cut". When the process of S20 is completed, the processes of FIG. 3 are completed.

In S30, the CPU 32 sends GPA res which includes "iso_a4_210×297 mm, iso_a5_148×210 mm" as ms and "media-size=iso_a5_148×210 mm" as mcr to the PC 100. That is, this GPA res does not include the information indicating "A5-cut". When the process of S30 is completed, the processes of FIG. 3 are completed.

Case A; FIG. 4

Next, with reference to FIG. 4, Case A implemented by the processes of FIG. 3 will be described. In Case A, in T10, the user sets the sheet paper 56 of A4 size in the container unit 18 of the printer 10.

When the printer 10 (i.e., CPU 32) accepts the sheet paper 56 set in T10, the printer 10 displays a size inputting screen on the display unit 12 in T12. The size inputting screen includes a message for inquiring the user about the size of the sheet paper set in the container unit 18, a box for selecting the contained paper size, and an OK button. The printer 10 accepts selection of the contained paper size "A4" and selection of the OK button in T14, and stores the contained paper size "A4" in the memory 34 in T16. In a modification, the printer 10 may comprise a sensor configured to detect the contained paper size. In this case, the user does not need to select which size the contained paper size is.

Subsequently, in the case where the contained paper size is "A4", the printer 10 displays a selection screen for allowing the user to select whether to cut the sheet paper in T18. The user selects cutting "On" included in the selection screen in T20. In this case, the printer 10 stores the cutting setting value "On" in the memory 34 in T22. Thus, the user is able to select whether to cut the sheet paper. Here, in a case where the contained paper size is "A5", the printer 10 does not display the selection screen of T18. This is because the printer 10 is configured not to cut the sheet paper of A5 size.

Thereafter, the user performs a print operation on the PC 100 in T30. The print operation comprises an operation of selecting image data representing an image to be printed and an operation of activating the general-purpose driver 102. Due to this, respective following processes are executed by the general-purpose driver 102. When the PC 100 has accepted the print operation from the user in T30, the PC 100 sends GPA req to the printer 10 in T32.

When the GPA req is received from the PC 100 in T32 (i.e., trigger for the processes of FIG. 3), the printer 10 determines that the contained paper size stored in the memory 34 is "A4" ("A4" in S10) and determines that the cutting setting value stored in the memory 34 is "On" (YES in S12). The printer 10 then sends GPA res to the PC 100 in T34 (S14). The GPA res sent in T34 includes the respective information of S14 of FIG. 3.

When the PC 100 receives the GPA res from the printer 10 in T34, the PC 100 displays a print setting screen D1 in T36. As shown in FIG. 5, the print setting screen D1 includes a preview screen showing an image to be printed, a size selection box for selecting the size of the sheet paper to be printed, and a Print button.

The PC 100 is configured to display one or more sizes of the sheet paper indicated by respective piece(s) of information in ms included in the GPA res of T34 or one or more sizes of the sheet paper indicated by media-size in mcr included in the same GPA res, by accepting an operation for pull-down in the size selection box. Here, which is displayed in the size selection box, the one or more sizes of the sheet paper indicated by respective piece(s) of information in ms or the one or more sizes of the sheet paper indicated by media-size in mcr, depends on an operating system (OS) program of the PC 100 (the program being not shown) and a program which operates on the OS program (e.g., application, Plug-in driver). That is, there are an OS program and a program which operates on the OS program by which one or more sizes of the sheet paper indicated by respective piece(s) of information in ms are displayed in the size selection box, and there are also an OS program and a program which operates on the OS program by which one or more sizes of the sheet paper indicated by media-size in mcr are displayed in the size selection box. That is why the printer 100 sends the GPA res which includes both ms and mcr to the PC 100. Alternatively in a modification, the printer 100 may send the GPA res which includes only one of ms and mcr to the PC 100.

The OS program of the PC 100 and the program which operates on the OS are programs by which one or more sizes of the sheet paper indicated by media-size in mcr are displayed. In a modification, the OS program of the PC 100 and the program which operates on the OS may be programs by which one or more sizes of the sheet paper indicated by respective piece(s) of information in ms are displayed.

When the PC 100 accepts a selection for pull-down in the size selection box, the PC 100 displays two choices "A4" and "A5-cut" (see screen D2 in FIG. 5) indicated by "media-size=iso_a4_210×297 mm" and "media-size=om_a5-cut_148×210 mm" in mcr included in the GPA res of T34. Then, when the PC 100 accepts selection of the size "A5-cut" in T38, the PC 100 displays "A5-cut" in the size selection box as shown in a screen D3.

Thereafter, when the PC 100 accepts the Print button in the screen D3 in T40, the PC 100 sends Validate-Job req including "media-size=om_a5-cut_148×210 mm" corresponding to the selected "A5-cut" to the printer 10 in T42.

When the printer 10 receives the Validate-Job req according to the IPP scheme in T42, the printer 10 sends Validate-Job res to the PC 100 in T44. As a result of this, the printer 10 receives Create-Job req according to the IPP scheme from the PC 100 in T46, and sends Create-Job res to the PC 10 in T48. The Create-Job req of T46 includes the same information as the Validate-Job of T42.

When the PC 100 receives the Create-Job res from the printer 10 in T48, the PC 100 converts the image data to be printed and generates print data having a data format which can be interpreted by the printer 10. The image represented by the print data has a size corresponding to "media-size=om_a5-cut_148×210 mm" included in the Validate-Job req (that is, 148×210 mm). Then the PC 100 sends Send-Document req according to the IPP scheme to the printer 10 in T50, and sends the print data to the printer 10 in T52.

The printer 10 receives Send-Document req from the PC 100 in T50, and receives the print data from the PC 100 in T52. In this case, the printer 10 sends Send-Document res in T54, and executes a printing process in T56.

In the printing process of T56, the printer 10 firstly activates the rollers 58, 60 of the transport unit 20 and transports the sheet paper 56 of A4 size contained in the container unit 18 to the print executing unit 22. Here, the sheet paper 56 of A4 size is transported along a direction in which its long sides extend. Then, the printer 10 creates a rotated image by rotating the image represented by the print data by 90 degrees and instructs the print executing unit 22 to print the rotated image. Due to this, the print executing unit 22 prints the rotated image on a downstream half region of the A4-sized sheet paper 56 (i.e., half part downstream in the transport direction). That is, nothing is printed on an upstream half region of the A4-sized sheet paper 56 (i.e., half part upstream in the transport direction).

Subsequently, the printer 10 activates the respective rollers 60, 62, 64 of the transport unit 20 to transport the A4-sized printed sheet paper 56 to the cutting unit 24. Then, the CPU 32 instructs the cutting unit 24 to cut the A4-sized printed sheet paper 56. Due to this, the cutting unit 24 cuts the A4-sized printed sheet paper 56 at a boundary between a downstream half region and an upstream half region. That is, the cutting unit 24 cuts the sheet paper 56 along a straight line connecting respective middle points of a pair of long sides of the sheet paper 56, by which the sheet paper 56 is cut in half. As a result, a cut sheet paper on which the rotated image is printed and a cut sheet paper on which no image is printed are formed. Each of the two cut sheets has a size indicated by the above-mentioned media-size (i.e., 148×210 mm).

Subsequently, the printer 10 activates the respective rollers 64 and 66 of the transport unit 20 to transport the two sheet papers as cut to the output tray 50. Due to this, the two sheet papers as cut of A5 size are supplied to the user.

When the printer 10 receives Get-Printer-Attributes req from the PC 100 in T58, the printer 10 sends Get-Printer-Attributes res including Job-state "completed" indicating that the printing process has completed to the PC 100 in T60.

In the present embodiment, the PC 100 comprises a general-purpose driver 102, not a dedicated driver. If the PC 100 comprises a dedicated driver dedicated for the printer 10 being configured to cut sheet paper, the PC 100 is able to allow the user to select whether to cut the sheet paper in the print setting screen. However, it is difficult for the general-purpose driver 102 to allow the user to make such selection. Since printers configured to cut (sheets of) sheet paper have not been widely known, it is highly not likely that setting items for conducting such selection are provided in its print setting screen. Accordingly, the printer 10 does not receive a cutting request command for instructing to cut the sheet paper from the PC 100 comprising the general-purpose driver 102.

The printer 10 is able to switch whether to cause the cutting unit 24 to cut the sheet paper even when the cutting request command is not received from the PC 100. Specifically, in a case where the printer 10 receives GPA req from the PC 100, the printer 10 sends GPA res including the information of the A4-sized sheet paper being actually contained and the information of the sheet paper of A5-cut size as the capability information (i.e., mcr) to the PC 100 (S14 of FIG. 3, T34 of FIG. 4). The PC 100 then displays the print setting screen D1 including choices complying with the capability information (T34 of FIG. 4).

When the user does not wish the sheet paper to be cut, the user may select the paper size "A4" in the print setting screen (see FIG. 5). In this case, the printer 10 determines that the cutting of the sheet paper is not to be performed in response to receiving Create-Job req including "media-size=iso_a4_210×297 mm" in T46, and thus does not cut the sheet paper. Also, when the user wishes the sheet paper to be cut, the user may select the paper size "A5-cut". In this case, the printer 10 receives Create-Job req including "media-size=om_a5-cut_148×210 mm" and determines that the cutting of the sheet paper is to be performed in T46, and thus cuts the sheet paper. As such, even when the printer 10 does not receive the cutting request command from the PC 100, the printer 10 is able to switch whether to cut the sheet paper or not.

Further, in the modification where the OS program of the PC 100 is the OS program by which one or more sizes of the sheet paper indicated by the respective pieces in ms are displayed in the size selection box in the print setting screen, three choices "A4", "A5", and "A5-cut" indicated by "iso_a4_210×297 mm", "iso_a5_148×210 mm", and "om_a5-cut_148×210 mm" in ms are displayed. In the present modification, a process of a case where the size "A4" or "A5-cut" is selected is the same as the above process. On the other hand, in a case where the size "A5" is selected by the user, the printer 10 may display a paper error on the display unit 12 because the contained paper size (i.e., A4) and the size selected by the user (i.e., A5) do not match.

Here, a case where the contained paper size of the sheet paper 56 being contained in the container unit 18 of the printer 10 is not A4 size but A5 size (i.e., "A5" of S10 of FIG. 3) will be described.

In the case where the contained paper size is A5 size, the printer 10 sends GPA res including the respective information of S30 of FIG. 3 to the PC 100 in T34. When the PC 100 receives the GPA res from the printer 10 in T34, the PC 100 displays the print setting screen in T36. In the size selection box of the print setting screen, one choice "A5" indicated by "media-size=iso_a5_148×210 mm" in mcr included in this GPA res only is displayed. Accordingly, the user can select the size "A5" only. Due to this, the PC 100 sends Create-Job req including "media-size=iso_a5_148×210 mm" to the printer 10 in T46. As a result of this, the printer 10 prints an image of A5 size on the sheet paper of A5 size being contained in the container unit 18 in T56, and does not cut the sheet paper.

As mentioned above, the printer 10 is configured not to cut the sheet paper in the case where the printer 10 contains the A5 size. This is because it is not likely that the user wishes the sheet paper of A5 size to be cut. Accordingly, in the case where the printer 10 contains the A5 size, the printer 10 sends GPA res including the information related to A5 size only as the capability information (i.e., mcr) to the PC 100. This lessens the number of choices displayed on the print setting screen, as a result of which the user is able to easily select an appropriate print setting according to the size of the sheet paper "A5" being actually contained.

Further, in the modification where the OS program of the PC 100 is the OS program by which one or more sizes of the sheet paper indicated by the respective pieces of information in ms are displayed in the size selection box in the print setting screen, two choices "A4" and "A5" indicated by "iso_a4_210×297 mm" and "iso_a5_148×210 mm" in ms. In the present modification, in the case where the size "A5" is selected by the user, the A5-sized image is printed on the A5-sized sheet paper, and the sheet paper is not cut, as mentioned above. On the other hand, in a case where the size "A4" is selected by the user, the printer 10 may display a paper error on the display unit 12 because the contained paper size (i.e., A5) and the size selected by the user (i.e., A4) do not match.

Next, a case where the contained paper size of the sheet paper 56 being contained in the container unit 18 of the printer 10 is A4 size and the cutting setting value "Off" is stored in the memory 34 will be described.

The printer 10 sends GPA res including the information of S20 of FIG. 3 to the PC 100 in T34. When the PC 100 receives this GPA res in T34, the PC 100 displays the print setting screen in T36. In the size selection box of this print setting screen, only one choice "A4" indicated by "media-size=iso_a4_210×297 mm" in mcr included in the GPA res of T34 is displayed. Thus, the user can only select the size "A4". Due to this, the PC 100 sends Create-Job req including "media-size=iso_a4_210×297 mm" to the printer 10 in T42. As a result, the printer 10 prints an image of A4 size on the A4-sized sheet paper being contained in the container unit 18 in T56, and does not cut the sheet paper.

As mentioned above, the printer 10 is configured not to cut the sheet paper in the case where the cutting setting value selected by the user is Off. Since whether to cut the sheet paper or not can be switched depending on user's intention, user convenience is improved. Especially in the case where the cutting setting value is Off, the printer 10 sends GPA res which does not include the information related to A5 size being not actually contained as the capability information (i.e., mcr) to the PC 100. This lessens the number of choices displayed on the print setting screen, as a result of which the user is able to easily select an appropriate print setting according to the size of the sheet paper "A4" being actually contained.

Further, in the modification where the OS program of the PC 100 is the OS program by which one or more sizes of the sheet paper indicated by the respective pieces of information in ms are displayed in the size selection box in the print setting screen, two choices "A4" and "A5" indicated by "iso_a4_210×297 mm" and "iso_a5_148×210 mm" in ms are displayed. In the present modification, in a case where the size "A4" is selected, as mentioned above, the A4-sized image is printed on the A4-sized sheet paper, and the sheet paper is not cut. On the other hand, in the case where the size "A5" is selected, the printer 100 may display a paper error on the display unit 12 because the contained paper size (i.e., A4) and the size selected by the user (i.e., A5) do not match.

(Case B; FIG. 6

Next, with reference to FIG. 6, Case B implemented by the processes of FIG. 3 will be described. In Case B, a selection of "A5-cut" is accepted as the contained paper size. Processes of T110 and T112 are the same as the processes of T10 and T12 of FIG. 4.

The printer 10 accepts selection of the contained paper size "A5-cut" and selection of the OK button in T114 from the user, and stores the contained paper size "A5-cut" in the memory 34 in T116. In Case B, since the contained paper size is "A5-cut", the selection screen (see T18 of FIG. 4) for causing the user to select whether to cut the sheet paper is not displayed. The selection by the user of the contained paper size "A5-cut" means a situation where the user wishes the A4-sized sheet paper to be cut. Due to this, the displaying of unnecessary screen can be suppressed.

Processes of T130 to T136 are the same as the processes of T30 to T36 of FIG. 4 ("A5-cut" in S10, S14 of FIG. 3). The PC 100 accepts selection of the size "A4" in T138. In this case, although not shown, "A4" is displayed in the size selection box.

Thereafter, when the PC 100 accepts selection of the Print button in T140 in the print setting screen, the PC 100 sends Validate-Job req including "media-size=iso_a4_210×297 mm" corresponding to the selected "A4" to the printer 10 in T142. Processes of T144 to T154 are the same as the processes of T44 to T54 of FIG. 4 except that the information included in Create-Job req is "media-size=iso_a4_210×297 mm".

In a printing process of T156, the printer 10 firstly activates the rollers 58, 60 of the transport unit 20 and transports the sheet paper 56 of A4 size being contained in the container unit 18 to the print executing unit 22. Then, the printer 10 instructs the print executing unit 22 to print an image represented by the print data on a substantially entire sheet of the sheet paper 56. Due to this, the print executing unit 22 prints the image on the substantially entire sheet of the sheet paper 56. Subsequently, the CPU 32 activates the rollers 60, 62, 64, 66 of the transport unit 20, and transports the printed sheet paper 56 to the output tray 50. The CPU 32 does not instruct the cutting unit 24 to cut the printed sheet paper 56. As a result of this, one printed sheet of paper is formed. Processes of T158 and T160 are the same as the processes of T58 and T60 of FIG. 4.

Effects of First Embodiment

According to the above configuration, in the case where the A4-sized sheet paper is contained in the container unit 18, the printer 10 sends GPA res including "media-size=om_a5-cut_148×210 mm" indicating the paper size "A5-cut" to the PC 100 (see S14 of FIG. 3, T34 of FIG. 4, T134 of FIG. 6). "media-size=om_a5-cut_148×210 mm" includes the character string "A5-cut" indicating cutting. As a result of this, the character string "A5-cut" is displayed on the PC 100 (in particular, the print setting screen (see D2 of FIG. 5)). Accordingly, in the case where the user wishes to have the sheet paper cut, the user can easily select the character string "A5-cut" displayed on the PC 100. Due to this, user convenience is improved.

Correspondence Relationships

The printer 10, the PC 100 are respectively an example of "printer", "terminal device." The cutting unit 24 is an example of "process executing unit". The cutting of the sheet paper is an example of "predetermined process". The general-purpose driver 102 is an example of "general-purpose driver". The size inputting screen displayed in T12 of FIG. 4 is an example of "first inputting screen". The size indicated by the paper size "A4", the size indicated by the paper size "A5", and the size indicated by the paper size "A5-cut" are respectively an example of "first size", "second size", and "specific size". The A4-size paper, the A5-size paper are respectively an example of "first sheet paper", "second sheet paper." "media-size=iso_a4_210×297 mm", "media-size=iso_a5_148×210 mm", "media-size=om_a5-cut_148×210 mm" in mcr are respectively an example of "first size information", "second size information", and "specific size information". The character string "a5-cut", the character string "148×210 mm" that are included in "media-size=om_a5-cut_148×210 mm" are respectively an example of "specific character string", "first character string". GPA res, Create-Job req (and/or Validate-Job req) are respectively "capability information", "selection information".

The processes of S14, S20, S30 of FIGS. 3 and T34 of FIG. 4 are an example of "send capability information". The processes of T46 and 52 of FIG. 4 are an example of "receive image data representing an image to be printed and selection information". The process of T56 of FIG. 4 is an example of "cause the transportation unit to transport the first sheet paper and cause the print executing unit to print the image on the first sheet paper" and "cause the process executing unit to execute the predetermined process". The processes of T18 and T12 of FIG. 4 are respectively an example of "cause the display unit to display a selection screen", "cause the display unit to display a first inputting screen".

SECOND EMBODIMENT

Next, a second embodiment will be described. In the second embodiment, a specific definition of size of the paper size "A5-cut" which is defined by the vendor of the printer 10 is different from that of the first embodiment, as shown in S14 of FIG. 3. Specifically, in the second embodiment, "media-size=om_a5-cut_147×210 mm" is adopted as the definition of the paper size "A5-cut".

In the first embodiment, the specific size of the paper size A5 written in tables 3 to 7 of PWG MSN 2.0 and the specific size of the paper size A5-cut defined by the vendor of the printer 10 (i.e. the paper size other than the ones written in tables 3 to 7 of PWG MSN 2.0) are equal to each other (i.e., "148×210 mm"). In this case, there is a possibility that the paper size "A5" and the paper size "A5-cut" might be identified by the PC 100 as the same paper size "A5" depending on the OS program, due to the former specific size and the latter specific size being the same. As a result, the choice "A5-cut" is not displayed in the size selection box of the print setting screen (see FIG. 5), as a result of which the user is now unable to select the paper size "A5-cut" in the print setting screen D2. Contrary to this, in the second embodiment, the specific size of the paper size A5 written in tables 3 to 7 of PWG MSN 2.0 (i.e., "148×210 mm") and the specific size of the paper size A5-cut defined by the vendor of the printer 10 (i.e., the paper size other than the ones written in tables 3 to 7 of PWG MSN 2.0, i.e., "147×210 mm") are different from each other. Due to this, the two paper sizes "A5" and "A5-cut" are identified as different paper sizes. As a result, the choice "A5-cut" is displayed in the size selection box of the print setting screen, by which the user is able to select the paper size "A5-cut" in the print setting screen D2. Further, the specific size of the paper size A5-cut "147×210 mm" is just an example, and just needs to be different from the specific size of the paper size A5 "148×210 mm". The character string "147×210 mm" included in "media-size=om_a5-cut_147×210 mm" is an example of "second character string".

THIRD EMBODIMENT

Next, a third embodiment will be described. In the third embodiment, the memory 34 of the printer 10 further stores contained paper type (see FIG. 2). The contained paper type indicates a type of sheet paper being contained in the container unit 18. "Type of sheet paper" may for example be plain paper, glossy paper. In the present embodiment, the container unit 18 is configured to contain plain paper. Although details will be described later, the type of the sheet paper is inputted by the user to the printer 10 upon the sheet paper being set the container unit 18. The inputted type is stored as the contained paper type in the memory 34. In the present embodiment in particular, the user is able to input paper type(s) that are not the ones written in 3.1 Standard Media Type Names of PWG MSN 2.0, in addition to the various paper types written in 3.1 Standard Media Type Names of PWG MSN 2.0 (e.g., plain paper, glossy paper). The former paper type(s) not written in 3.1 Standard Media Type Names of PWG MSN 2.0 are paper type(s) defined by the vendor of the printer 10, and specifically is "cut paper". The paper type "cut paper" is information indicating a paper type related to the cutting of the sheet paper. Alternatively in a modification, the paper type related to the cutting of the sheet paper may for example be "cut stationery", "cut plain paper", instead of "cut paper". That is, the paper type "cut paper" related to the cutting of the sheet paper is just an example, and may be any other character string as long as it is related to cutting.

Capability Information Sending Process; FIG. 7

With reference to FIG. 7, capability information sending process implemented by the CPU 32 of the printer 10 will be described. The capability information sending process starts with receiving GPA req from the PC 100 as its trigger.

In S110, the CPU 32 determines whether the contained paper size stored in the memory 34 (i.e., size of the sheet paper 56 being contained in the container unit 18) is A4. In the case where the contained paper size is determined to be A4 (YES in S110), the CPU 32 proceeds to S111, and in the case where the contained paper size is determined to be A5 (NO in S110), the CPU 32 proceeds to S130.

In S111, the CPU 32 determines whether the contained paper type stored in the memory 34 is "cut" or not. In a case where the contained paper type is determined to be "cut" (YES in S111), the CPU 32 proceeds to S114, and in a case where the contained paper type is determined as not being "cut" (i.e., plain paper) (NO in S111), the CPU 32 proceeds to S112. A process of S112 is the same as the process of S12 of FIG. 3

A process of S114 is the same as the process of S14 of FIG. 3 except that ms does not include "om_a5-cut_148× 210 mm", mcr includes "media-size=iso_a5_148×210 mm" instead of "media-size=om_a5-cut_148×210 mm", and mcr further includes "media-type". That is, in S114, the CPU 32 notifies the PC 100 of not only the information of A4 size being actually contained but also the information of A5 being not actually contained.

Especially, mcr of S114 includes "media-type=stationery, cut paper". "media-type=stationery" indicates that plain paper is contained in the container unit. Also, "media-type=cut paper" includes a character string "cut paper" indicating a paper type which does not actually exist (i.e., paper type defined by the vendor). "media-type=cut paper" indicates that the paper type "cut paper" is contained although it is not actually contained. In other words, "media-type=cut paper" indicates that the printer 10 is capable of cutting the sheet paper. In a modification, the information indicating the type of the sheet paper being in contained in the container unit 18 may be sent as media-ready instead of as mcr. When the process of S114 is completed, the processes of FIG. 7 are completed. Here, the paper type "cut paper" may be the same character as the character string "cut paper" included in "media-size=cut paper", or may be different therefrom. Further, media-type may include one of or both of: descriptions defined by any of 3.2 Vender Media Type Names, 3.3 Custom Media Type Names, and 3.4 Derived Media Type Names of PWG MSN 2.0 such as "com.brother cut paper", "com.brother cut stationery"; and a character string to be displayed on the print setting screen displayed on the PC 100 (see D14 of FIG. 9 for example) such as "cut paper", "cut plain paper".

A process of S120 is the same as the process of S20 of FIG. 3 except that mcr includes "media-type=stationery". Also, a process of S130 is the same as the process of S30 of FIG. 3 except that mcr includes "media-type=stationery".

Case C; FIG. 8

Next, with reference to FIG. 8, specific Case C implemented by the processes of FIG. 7 will be described. In Case C, in T210, the user sets plain paper (i.e., sheet paper) of A4 size in the container unit 18 of the printer 10.

The printer 10 (i.e., the CPU 32) accepts the setting of the sheet paper 56 in T210. In this case, the printer 10 stores the contained paper size "A4" in the memory 34 (T12 to T16 of FIG. 4). Further, the printer 10 displays a type inputting screen on the display unit 12 in T212. The type inputting screen includes a message for inquiring of the user what type the sheet paper set in the container unit 18 is, an area for selecting the contained paper type, and an OK button. The printer 10 accepts, from the user, selection of the contained paper type "plain paper" and selection of the OK button in T214, and stores the contained paper type "plain paper" in the memory 34 in T216. Processes of T218 to T232 are the same as the processes of T18 to T32 of FIG. 4.

When the printer 10 receives GPA req from the PC 100 (trigger for the processes of FIG. 7) in T232, the printer 10 determines that the contained paper size stored in the memory 34 is "A4" (YES in S110), determines that the contained paper type stored in the memory 34 is "plain paper" (NO in S111), and determines that the cutting setting value stored in the memory 34 is "On" (YES in S112). The printer 10 then sends GPA res to the PC 100 in T234 (S114). The GPA res sent in T234 includes the respective information of S114 of FIG. 7.

When the PC 100 receives the GPA res from the printer 10 in T234, the PC 100 displays a print setting screen D11 in T236. As shown in FIG. 9, the print setting screen D11 includes a preview image indicating an image to be printed, a size selection box for selecting the size of the sheet paper to be printed, a type selection box for selecting the type of the sheet paper to be printed, and a Print button.

When the PC 100 accepts a selection for pull-down in the size selection box, the PC 100 displays two choices "A4" and "A5" (see screen D12 in FIG. 9) indicated by "media-size=iso_a4_210×297 mm" and "media-size=iso_a5_148× 210 mm" in mcr included in the GPA res of T234. Then, when the PC 100 accepts selection of the size "A5" in T238, the PC 100 displays "A5" in the size selection box as shown in a screen D13.

Then, when the PC 100 accepts a selection for pull-down in the type selection box in the screen D13, the PC 100 displays two choices "plain paper" and "cut paper" (see screen D14 in FIG. 9) indicated by "media-type=stationery" and "media-type=cut paper" included in GPA res of T234. Then, when the PC 100 accepts selection of the type "cut paper" in T238, the PC 100 displays "cut paper" in the type selection box as shown in a screen D15.

Thereafter, when the PC 100 accepts the Print button in the screen D15 in T240, the PC 100 sends Validate-Job req including "media-size=iso_a5_148×210 mm" corresponding to the selected "A5" and "media-type=cut paper" corresponding to the selected "cut paper" to the printer 10 in T242. Thereafter, processes the same as T44 to T60 of FIG. 4 will be performed except that the information included in the Create-Job Req is different. As a result of this, two sheet papers as cut are formed.

In a case where the user does not wish to cut the sheet paper, the user may select the paper size "A4" and the paper type "plain paper" in the print setting screen (see FIG. 9). In this case, the printer 10 determines that the sheet paper is not to be cut in response to receiving the Create-Job req including "media-size=iso_a4_210×297 mm" and "media-type=stationery" in T46 of FIG. 4 referred to in FIG. 8, and does not cut the sheet paper. Further, in the case where the user wishes the sheet paper to be cut, the user may select the paper size "A5" and the paper type "cut paper" in the print setting screen. In this case, the printer 10 receives Create-Job req including "media-size=iso_a5_148×210 mm" and "media-type=cut paper" in T46 of FIG. 4 referred to in FIG. 8, determines that the sheet paper is to be cut, and cuts the sheet paper. As such, even when the printer 10 does not receive a cutting request command from the PC 100, the printer 10 is able to switch whether to cut the sheet paper.

Further, in the case where the printer 10 accepts selection of the paper size "A4" and the paper type "cut paper" from the user, the printer 10 may display a paper error on the display unit 12 because the contained paper size (i.e., A4) and the size selected by the user (i.e., A4) match and the paper type "cut paper" has been selected. Further, in the case where the printer 10 accepts selection of the paper size "A5" and paper type "plain paper" from the user, the printer 10 may display a paper error on the display unit 12 because the contained paper size (i.e., A4) and the size selected by the user (i.e., A5) do not match and the paper type "plain paper" has been selected.

Next, a case where the size of the sheet paper 56 being contained in the container unit 18 of the printer 10 is A4, the paper type is plain paper, and the memory 34 stores the cutting setting value "Off" will be described.

The printer 10 sends GPA res including respective information of S120 of FIG. 7 to the PC 100 in T34. When the PC 100 receives this GPA res in T234, the PC 100 displays a print setting screen in T236. In the type selection box of this print setting screen, one choice "plain paper" indicated by "media-type=stationery" in mcr included in the GPA res of T234 only is displayed. Accordingly, the user can only select the type "plain paper". Due to this, the PC 100 sends Create-Job req including "media-type=stationery" in T46 of FIG. 4 referred to in FIG. 8 to the printer 10. As a result, the printer 10 prints an image on a plain paper of A4 size (i.e., the sheet paper) being contained in the container unit 18 in T56 of FIG. 4 referred to in FIG. 8, and does not cut the sheet paper.

As mentioned above, the printer 10 is configured not to cut the sheet paper in the case where the cutting setting value selected by the user is Off. Since whether to cut the sheet paper or not can be switched depending on user's intention, user convenience is improved. Especially in the case where the cutting setting value is Off, the printer 10 sends GPA res which does not include the information related to the cutting of the sheet paper (i.e., "media-type=cut paper") as the capability information (i.e., mcr) to the PC 100. This lessens the number of choices displayed on the print setting screen, as a result of which the user is able to easily select an appropriate print setting according to the type "plain paper" of the sheet paper being actually contained.

(Case D; FIG. 10)

Subsequently, with reference to FIG. 10, Case D implemented by the processes of FIG. 7 will be described. In Case D, the selection of "sheet paper" is accepted as the contained paper type from the user. Processes of T310 and T312 are the same as the processes of T210 and T212 of FIG. 8.

The printer 10 accepts selection of the contained paper type "cut paper" and selection of the OK button from the user in T314, and stores the contained paper type "cut paper" in the memory 34 in T316. In Case D, since the contained paper type is "cut paper", a selection screen (see T218 of FIG. 8) for causing the user to select whether to cut the sheet paper is not displayed. The user selecting the contained paper type "cut paper" means that the user wishes the sheet paper to be cut. Due to this, the displaying of unnecessary screen can be suppressed. Processes of T330 to T342 are the same as T230 to T242 of FIG. 8. Thereafter, processes the same as T44 to T60 of FIG. 4 are performed except that the information included in Create-Job Req is different. As a result of this, two sheet papers as cut are formed.

Effects of Third Embodiment

According to the above configuration, in the case where plain paper is contained in the container unit 18, the printer 10 sends GPA res including "media-type=cut paper" indicating the paper type "cut paper" to the PC 100 (S114 of FIG. 7, T234 of FIG. 8, T334 of FIG. 10). "media-type=cut paper" includes the character string "cut" indicating cutting. As a result of this, the character string "cut paper" is displayed on the PC 100 (in particular, the print setting screen (see D14 of FIG. 9)). Accordingly, in the case where the user wishes to have the sheet paper to be cut, the user can easily select the character string "sheet paper" displayed on the PC 100. Due to this, user convenience is improved.

Correspondence Relationships

Plain paper is an example of "first sheet paper". The type inputting screen displayed in T212 of FIG. 8 is an example of "second inputting screen". The paper type "plain paper", the paper type "cut" are respectively an example of "first paper type", "specific paper type". "media-type=stationery", "media-type=sheet paper" are respectively an example of "first type information", "specific type information". The character string "sheet paper" included in "media-type=sheet paper" is an example of "specific character string". The process of T218 and the process of T212 of FIG. 8 are respectively an example of "cause the display unit to display a selection screen", "cause the display unit to display a second inputting screen".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The printer 10 may not display the selection screen. For example, whether to cut the sheet paper may be selected by the user operating a physical switch arranged on/in the printer 10. In another modification, whether to cut the sheet paper may be selected by the user attaching/removing a cutting mechanism to/from the printer 10. In another modification, whether to cut the sheet paper may be selected in a way that the printer 10 has a web server function, and the user accesses the web server in the printer 10 and selects whether to cut the sheet paper in a selection screen displayed on the PC 100 by operating the PC 100. In the present modification, "display unit" and "cause the display unit to display a selection screen" may be omitted. In another modification, the printer 10 may not cause the user to select whether to cut the sheet paper. That is, the printer 10 may be configured to send GPA res including the respective information of S14 of FIG. 3 in the case where it contains the sheet paper of A4 size.

(Modification 2) The printer 10 may display the selection screen even when the paper size "A5-cut" is selected by the user in T114 of FIG. 6. In this case, even when the contained paper size is "A5-cut" ("A5-cut" in S10 of FIG. 3), the printer 10 may perform the process of S12. Similarly, even when the paper type "cut" is selected by the user in T304 of FIG. 10, the printer 10 may display the selection screen. In this case, even when the contained paper type is "cut" ("cut" in S111 of FIG. 7), the printer 10 may perform the process of S112.

(Modification 3) The printer 10 may not generate a rotated image in a case where the printer 10 receives print data from the PC 100 after Create Job req including "media-size=om_a5-cut_148×210 mm" has been received from the PC 100. In this case, the printer 10 may arrange an image of A5 size on the sheet paper of A4 size and print thereon. Generally speaking, "controller" may not be configured to "generate a rotated image". Further, "controller" may not be configured to "cause the print executing unit to print the rotated image".

(Modification 4) The printer 10 may comprise a perforating unit configured to perforate a sheet paper instead of the cutting unit 24. With perforations created in the sheet paper, the user can easily cut the sheet paper along the perforations. In another MODIFICATION, the printer 10 may comprise a creasing unit configured to crease the sheet paper instead of the cutting unit 24. With a crease created on the sheet paper, the user can easily cut the sheet paper along the creases. Generally speaking, the "predetermined process" may be any process which is related to cutting of the sheet paper.

(Modification 5) The PC 100 may not comprise the general-purpose driver 102. In this case, the PC 100 comprises a dedicated driver instead of the general-purpose driver 102. The dedicated driver is a printer driver dedicated for a certain printer.

(Modification 6) Although in the above embodiments the cutting of sheet paper is performed after the printing to the sheet paper, in this MODIFICATION, the cutting of the sheet paper may be performed and then the printing of the sheet paper may be performed. Generally speaking, "process executing unit" may be arranged upstream of "print executing unit" in the transport direction.

(Modification 7) The above embodiments described the example where, in the case where the sheet paper 56 of A4 size is contained in the container unit 18, the sheet paper 56 of A4 size is cut in half, by which two sheet papers of A5 size as cut are formed. In a modification, in the case where the sheet paper 56 of a size possible to cut into is contained in the container unit 18, this sheet paper 56 may be cut in half, by which two sheet papers of a size being half of the above paper size are formed. For example, in a case where the sheet paper 56 of A3 size is contained in the container unit 18, the A3-sized sheet paper 56 may be cut in half, by which two sheet papers of A4 size as cut are formed. Further, in a case where the sheet paper 56 of letter size is contained in the container unit 18, the sheet paper 56 of letter size may be cut in half, by which two sheet papers of half letter size as cut are formed.

(Modification 8) Although in the above embodiments each process in FIG. 3 to FIG. 10 is implemented by a software, but at least one of those processes may be implemented by hardware such as a logic circuit.

What is claimed is:

1. A printer comprising:
   a container unit configured to contain a sheet paper;
   a transportation unit configured to transport the sheet paper from the container unit;
   a print executing unit configured to execute printing on the sheet paper;
   a process executing unit configured to execute a predetermined process related to cutting the sheet paper; and
   a controller,
   wherein the controller is configured to:
   send capability information to a terminal device, wherein in a case where a first sheet paper having a first size is contained in the container unit, the capability information includes specific size information indicating a sheet paper having a specific size which is smaller than the first size and first size information indicating that the first sheet paper having the first size is contained, and the specific size information includes a specific character string indicating a content of the predetermined process;
   in response to a user selecting the specific character string displayed on the terminal device after the capability information has been sent to the terminal device, receive selection information indicating that the specific size was selected and image data representing an image to be printed from the terminal device;
   in response to the user selecting a first character string indicating the first size displayed on the terminal device, receive first selection information indicating that the first size was selected and the image data from the terminal device;
   in a case where the specific selection information and the image data are received from the terminal device, or in a case where the first selection information and the image data are received from the terminal device, cause the transportation unit to transport the first sheet paper and cause the print executing unit to print the image on the first sheet paper; and
   in a case where the specific selection information is received from the terminal device, cause the process executing unit to execute the predetermined process on the first sheet paper,
   wherein, in a case where the first selection information is received from the terminal device, the process executing unit is not caused to execute the predetermined process on the first sheet paper.

2. The printer according to claim 1, wherein the specific size information indicates at least one of:
   a sheet paper having the specific size is contained in the container unit, and
   printing on a sheet paper having the specific size is executable.

3. The printer according to claim 1, wherein the specific size information further includes a first character string indicating paper sizes described in Tables 3 to 7 written in the Printer Working Group Media Standardized Names 2.0 (PWG MSN 2.0).

4. The printer according to claim 1, wherein the specific size information further includes a second character string indicating a paper size other than paper sizes described in Tables 3 to 7 written in the Printer Working Group Media Standardized Names 2.0 (PWG MSN 2.0).

5. The printer according to claim 1, wherein in a first case where the first sheet paper is contained in the container unit and it is selected by the user that the predetermined process is to be executed on the first sheet paper, the controller is configured to send the capability information including the specific size information to the terminal device, and
   in a second case where the first sheet paper is contained in the container unit and it is selected by the user that the predetermined process is not to be executed on the first sheet paper, the controller is configured to send the capability information not including the specific size information to the terminal device.

6. The printer according to claim 5, further comprising a display unit, wherein the controller is further configured to:
cause the display unit to display a selection screen for causing the user to select whether the predetermined process is to be executed on the sheet paper, wherein the first case includes that the first sheet paper is contained in the container unit and that it is selected in the selection screen that the predetermined process is to be executed, and
the second case includes that the first sheet paper is contained in the container unit and that it is selected in the selection screen that the predetermined process is not to be executed.

7. The printer according to claim 5, further comprising a display unit, wherein the controller is further configured to:
cause the display unit to display a first inputting screen for inputting a size of the sheet paper being contained in the container unit,
wherein the first case includes that the first sheet paper is contained in the container unit and that the specific character string is inputted in the first inputting screen, and
the second case includes that the first sheet paper is contained in the container unit and that the first size is inputted in the first inputting screen.

8. The printer according to claim 7, wherein the controller is further configured to:
cause the display unit to display a selection screen for causing the user to select whether the predetermined process is to be executed on the sheet paper,
wherein the first case includes that the first sheet paper is contained in the container unit, that the first size is inputted in the first inputting screen, and that it is selected in the selection screen that the predetermined process is to be executed, and
the second case includes that the first sheet paper is contained in the container unit, that the first size is inputted in the first inputting screen, and that it is selected in the selection screen that the predetermined process is not to be executed.

9. The printer according to claim 8, wherein in a case where the first size is inputted in the first inputting screen, the controller is configured to cause the display unit to display the selection screen, and
in a case where the specific character string is inputted in the first inputting screen, the selection screen is not displayed.

10. The printer according to claim 1, wherein in a case where a second sheet paper having a second size different from the first size is contained in the container unit, the controller is configured to send, to the terminal device, the capability information including second size information indicating the second sheet paper having the second size is contained but not including the specific size information.

11. The printer according to claim 1, wherein in response to the user selecting the specific character string displayed on the terminal device after the capability information has been sent to the terminal device, the controller is configured to receive, from the terminal device, the specific selection information and the image data representing the image having a size corresponding to the specific size, and
in a case where the specific selection information and the image data are received from the terminal device and the specific size is equal to or less than half of the first size, the controller is configured to generate a rotated image obtained by rotating the image by 90 degrees and cause the print executing unit to print the rotated image on the first sheet paper.

12. The printer according to claim 1, wherein the predetermined process is any of a process to cut the sheet paper, a process to perforate the sheet paper, and a process to crease the sheet paper.

13. The printer according to claim 1, wherein the terminal device comprises a general-purpose printer driver, and
the controller is configured to receive the specific selection information and the image data from the general-purpose printer driver of the terminal device.

14. A printer comprising:
a container unit configured to contain a sheet paper;
a transportation unit configured to transport the sheet paper from the container unit;
a print executing unit configured to execute printing on the sheet paper;
a process executing unit configured to execute a predetermined process related to cutting of the sheet paper; and
a controller,
wherein the controller is configured to:
send capability information to a terminal device, wherein in a case where a first sheet paper having a first paper type is contained in the container unit, the capability information includes specific type information indicating a sheet paper having a specific paper type different from the first paper type and first type information indicating that the first sheet paper having the first paper type is contained, and the specific type information includes a specific character string indicating a content of the predetermined process;
in response to a user selecting the specific character string displayed on the terminal device after the capability information has been sent to the terminal device, receive specific selection information indicating that the specific paper type was selected and image data representing an image to be printed from the terminal device;
in response to the user selecting a first character string indicating the first paper type is displayed on the terminal device, receive first selection information indicating that the first paper type was selected and the image data from the terminal device;
in a case where the specific selection information and the image data are received from the terminal device, or in a case where the first selection information and the image data are received from the terminal device, cause the transportation unit to transport the first sheet paper and cause the print executing unit to print the image on the first sheet paper; and
in a case where the specific selection information is received from the terminal device, cause the process executing unit to execute the predetermined process on the first sheet paper,
wherein, in a case where the first selection information is received from the terminal device, the process executing unit is not caused to execute the predetermined process on the first sheet paper.

15. The printer according to claim 14, wherein in a third case where the first sheet paper is contained in the container unit and it is selected by the user that the predetermined process is to be executed on the first sheet paper, the controller is configured to send the capability information including the specific type information to the terminal device, and in a fourth case where the first sheet paper is contained in the container unit and it is selected by the user that the predetermined process is not to be executed on the first sheet paper, the controller is configured to send the capability information not including the specific type information to the terminal device.

16. The printer according to claim 15, further comprising a display unit, wherein the controller is further configured to:
cause the display unit to display a selection screen for causing the user to select whether the predetermined process is to be executed on the sheet paper,
wherein the third case includes that the first sheet paper is contained in the container unit and that it is selected in the selection screen that the predetermined process is to be executed, and
the fourth case includes that the first sheet paper is contained in the container unit and that it is selected in the selection screen that the predetermined process is not to be executed.

17. The printer according to claim 15, further comprising a display unit, wherein the controller is further configured to:
cause the display unit to display a second inputting screen for inputting a type of the sheet paper being contained in the container unit,
wherein the third case includes that the first sheet paper is contained in the container unit and that the specific character string is inputted in the second inputting screen, and
the fourth case includes that the first sheet paper is contained in the container unit and that the first paper type is inputted in the second inputting screen.

18. The printer according to claim 17, wherein the controller is further configured to:
cause the display unit to display a selection screen for causing the user to select whether the predetermined process is to be executed on the sheet paper,
wherein the third case includes that the first sheet paper is contained in the container unit, that the first paper type is inputted in the second inputting screen, and that it is selected in the selection screen that the predetermined process is to be executed, and
the fourth case includes that the first sheet paper is contained in the container unit, that the first paper type is inputted in the second inputting screen, and that it is selected in the selection screen that the predetermined process is not to be executed.

19. The printer according to claim 18, wherein in a case where the first paper type is inputted in the second inputting screen, the controller is configured to cause the display unit to display the selection screen, and
in a case where the specific character string is inputted in the second inputting screen, the selection screen is not displayed.

20. The printer according to claim 14, wherein the predetermined process is any of a process to cut the sheet paper, a process to perforate the sheet paper, and a process to crease the sheet paper.

21. The printer according to claim 14, wherein the terminal device comprises a general-purpose printer driver, and
the controller is configured to receive the specific selection information and the image data from the general-purpose printer driver of the terminal device.

22. A non-transitory computer-readable recording medium storing computer-readable instructions for a printer, the printer comprising:
a container unit configured to contain a sheet paper;
a transportation unit configured to transport the sheet paper from the container unit;
a print executing unit configured to execute printing on the sheet paper;
a process executing unit configured to execute a predetermined process related to cutting of the sheet paper; and
a processor,
wherein the computer-readable instructions, when executed by the processor, cause the printer to:
send capability information to a terminal device, wherein in a case where a first sheet paper having a first size is contained in the container unit, the capability information includes specific size information indicating a sheet paper having a specific size which is smaller than the first size and first size information indicating that the first sheet paper having the first size is contained, and the specific size information includes a specific character string indicating a content of the predetermined process;
in response to a user selecting the specific character string displayed on the terminal device after the capability information has been sent to the terminal device, receive selection information indicating that the specific size was selected and image data representing an image to be printed from the terminal device;
in response to the user selecting a first character string indicating the first size displayed on the terminal device, receive first selection information indicating that the first size was selected and the image data from the terminal device;
in a case where the specific selection information and the image data are received from the terminal device, or in a case where the first selection information and the image data are received from the terminal device, cause the transportation unit to transport the first sheet paper and cause the print executing unit to print the image on the first sheet paper; and
in a case where the specific selection information is received from the terminal device, cause the process executing unit to execute the predetermined process on the first sheet paper,
wherein, in a case where the first selection information is received from the terminal device, the process executing unit is not caused to execute the predetermined process on the first sheet paper.

23. A non-transitory computer-readable recording medium storing computer-readable instructions for a printer which comprises:
a container unit configured to contain a sheet paper;
a transportation unit configured to transport the sheet paper from the container unit;
a print executing unit configured to execute printing on the sheet paper;
a process executing unit configured to execute a predetermined process related to cutting of the sheet paper; and
a processor,
wherein the computer-readable instructions, when executed by the processor, cause the printer to:
send capability information to a terminal device, wherein in a case where a first sheet paper having a first paper type is contained in the container unit, the capability information includes specific type information indicating a sheet paper having a specific paper type different from the first paper type and first type information indicating that the first sheet paper having the first paper type is contained, and the specific type information includes a specific character string indicating a content of the predetermined process;

in response to a user selecting the specific character string displayed on the terminal device after the capability information has been sent to the terminal device, receive selection information indicating that the specific paper type was selected and image data representing an image to be printed from the terminal device;

in response to the user selecting a first character indicating the first size displayed on the terminal device, receive first selection information indicating that the first size was selected and the image data from the terminal device;

in a case where the specific selection information and the image data are received from the terminal device, or in a case where the first selection information and the image data are received from the terminal device, cause the transportation unit to transport the first sheet paper and cause the print executing unit to print the image on the first sheet paper; and in a case where the specific selection information is received from the terminal device, cause the process executing unit to execute the predetermined process on the first sheet paper, wherein, in a case where the first selection information is received from the terminal device, the process executing unit is not caused to execute the predetermined process on the first sheet paper.

* * * * *